US012807148B2

(12) United States Patent
Moskowitz et al.

(10) Patent No.: US 12,807,148 B2
(45) Date of Patent: Nov. 24, 2026

(54) USING DEEP LEARNING TO IDENTIFY ROAD GEOMETRY FROM POINT CLOUDS

(71) Applicant: MOBILEYE VISION TECHNOLOGIES LTD., Jerusalem (IL)

(72) Inventors: Jeffrey Moskowitz, Tel Aviv (IL); Boris Braginsky, Sde Moshe (IL); David Boublil, Jerusalem (IL); Shmuel Hazut, Kefar Saba (IL); Alon Ziv, Motza Illit (IL); Yahel Guberman, Jerusalem (IL); Avner Yakov, Hafetz Haim (IL); Niv Keren, Tel Aviv-Jaffa (IL); Aryeh Nailand, Tel Aviv (IL); Adam Kaplan, Beer Yaakov (IL); Rotem Idelson, Tel Aviv (IL); Izhak Daniel Yacoby, Kibbutz Lahav (IL)

(73) Assignee: MOBILEYE VISION TECHNOLOGIES LTD., Jerusalem (IL)

( * ) Notice: Subject to any disclaimer, the term of this patent is extended or adjusted under 35 U.S.C. 154(b) by 0 days.

(21) Appl. No.: 18/909,705

(22) Filed: Oct. 8, 2024

(65) Prior Publication Data

US 2025/0115240 A1 Apr. 10, 2025

Related U.S. Application Data

(60) Provisional application No. 63/588,898, filed on Oct. 9, 2023.

(51) Int. Cl.

| | |
|---|---|
| ***B60W 30/10*** | (2006.01) |
| ***G01S 7/48*** | (2006.01) |
| ***G01S 17/89*** | (2020.01) |

(52) U.S. Cl.

CPC .......... *B60W 30/10* (2013.01); *G01S 7/4802* (2013.01); *G01S 17/89* (2013.01);

(Continued)

(58) Field of Classification Search

CPC ...... B60W 30/10; B60W 30/12; B60W 40/02; B60W 40/06; B60W 2420/408;

(Continued)

(56) References Cited

U.S. PATENT DOCUMENTS 9,285,230 B1 * 3/2016 Silver .................... G01S 13/86
2018/0364717 A1 * 12/2018 Douillard ............. G01S 17/931

(Continued)

FOREIGN PATENT DOCUMENTS

EP 3438776 A1 2/2019
WO 2023158706 A1 8/2023

*Primary Examiner* — Brandon Z Willis

(74) *Attorney, Agent, or Firm* — Sterne, Kessler. Goldstein & Fox P.L.L.C.

(57) ABSTRACT

Lidar produces three-dimensional point clouds. From the point clouds, objects need to be detected and tracked. For example, from the point clouds, embodiments detect what kind of objects are detected, what shape the object is, and the objects current location and trajectory. Each lidar sensor on a vehicle produces a point cloud periodically. The point cloud is input into a deep learning neural network that outputs road geometry, such as road edges and lane dividers. In some embodiments, the neural network can also output information about other objects in the environment, such as other vehicles and pedestrians.

20 Claims, 8 Drawing Sheets

(52) U.S. Cl.
CPC ... *B60W 2420/408* (2024.01); *B60W 2552/00* (2020.02); *B60W 2556/45* (2020.02)

(58) Field of Classification Search
CPC ......... B60W 2556/45; B60W 2552/10; B60W 2552/20; B60W 2552/50; B60W 2552/53; G01S 7/4802; G01S 17/89; G01S 17/931; G06N 3/02; G06N 3/045; G06N 3/08; G06V 10/22; G06V 10/25; G06V 10/44; G06V 10/764; G06V 10/82; G06V 20/182; G06V 20/56; G06V 20/58; G06V 20/588; G06V 20/64
See application file for complete search history.

(56) References Cited

U.S. PATENT DOCUMENTS

| | | | | |
|---|---|---|---|---|
| 2020/0233429 | A1* | 7/2020 | Zhang | G01S 13/865 |
| 2020/0250439 | A1* | 8/2020 | Vig | G05D 1/0246 |
| 2021/0039715 | A1* | 2/2021 | Ferrer | B60W 50/14 |
| 2021/0108926 | A1* | 4/2021 | Tran | G06V 20/58 |
| 2021/0141092 | A1* | 5/2021 | Chen | G01S 13/867 |
| 2021/0215805 | A1* | 7/2021 | Lever | G01S 17/894 |
| 2021/0354718 | A1* | 11/2021 | Lu | G01S 17/89 |
| 2022/0111868 | A1* | 4/2022 | Costea | B60W 30/0956 |
| 2023/0186647 | A1* | 6/2023 | Mahata | G01S 17/86 382/103 |
| 2023/0205219 | A1 | 6/2023 | Towal et al. | |
| 2024/0185523 | A1* | 6/2024 | Zhang | G06F 30/27 |
| 2024/0302502 | A1* | 9/2024 | Hollen | G01S 17/894 |

* cited by examiner

USING DEEP LEARNING TO IDENTIFY ROAD GEOMETRY FROM POINT CLOUDS

CROSS-REFERENCE TO RELATED APPLICATIONS

This application claims priority to U.S. Provisional Application No. 63/588,898, filed Oct. 9, 2023, which is hereby incorporated by reference in its entirety.

FIELD

The field relates to interpreting point clouds, for example, point clouds generated from vehicle mounted lidar.

BACKGROUND

Lidar, or light detection and ranging, is a remote sensing technique that uses pulses of laser light to measure distances and create high-resolution maps of the surface of the earth or other objects. Lidar works by emitting a beam of light from a transmitter and measuring the time and intensity of the reflected signal from a receiver. By scanning the beam across a target area, lidar can generate a three-dimensional point cloud of data that represents the shape, elevation, and features of the terrain, vegetation, buildings, or other structures. Lidar can be mounted on vehicles to support driver assistance and autonomous vehicles.

ADAS, or advanced driver assistance systems, are technologies that enhance the safety and convenience of drivers and passengers by providing assistance, warnings, or interventions in various driving scenarios. ADAS can involve parking sensors, blind spot monitors, adaptive cruise control and lane keeping assist, to fully autonomous ones, such as self-parking and self-driving. ADAS rely on various sensors, cameras, radars, lidars, and software to perceive the environment, detect potential hazards, and communicate with the driver or other vehicles. ADAS can help reduce human error, improve traffic flow, lower fuel consumption, and prevent collisions and injuries.

Autonomous vehicles, also known as self-driving cars, are vehicles that can operate without human intervention or supervision, using sensors, cameras, software, and artificial intelligence to perceive and navigate their environment. Autonomous vehicles have the potential to improve road safety, mobility, efficiency, and environmental sustainability, by reducing human errors, traffic congestion, fuel consumption, and greenhouse gas emissions.

As mentioned above, lidar sensors can produce point clouds. Point clouds are collections of data points that represent the shape and surface of an object or a scene in three-dimensional space. In addition to lidar, point clouds can be generated from other sensors including radar and cameras. These point clouds can pose some challenges, such as noise, incompleteness, redundancy, and complexity, that require efficient and robust processing and representation methods.

Improved methods for interpreting point clouds are needed.

SUMMARY

According to an embodiment, a computer-implemented method for detecting road geometry from point clouds is provided. In the method, a point cloud representing surroundings of the vehicle is determined using at least one sensor on a vehicle. Surroundings of the vehicle are partitioned into a plurality of voxels. Each voxel represents a volume in the surroundings of the vehicle. For each of the plurality of voxels, whether a three-dimensional data exists for the respective voxel is determined. When three-dimensional data is determined to exist, data representing points from the point cloud positioned within the respective voxel is input into a first neural network segment which creates fixed-size features for each voxel. The first neural network segment uses fully-connected and pooling operations to accomplish this. After the Feature Encoding segment, the voxel features enter a second neural network segment which performs sparse 3D convolutions of various types on the input. The 3D sparse segment then leads into a 2D convolutional segment before finally outputting the road geometry as well as objects within the scene. The road geometry and object detection are implemented as two heads of the same network.

System, device, and computer program product aspects are also disclosed.

Further features and advantages, as well as the structure and operation of various aspects, are described in detail below with reference to the accompanying drawings. It is noted that the specific aspects described herein are not intended to be limiting. Such aspects are presented herein for illustrative purposes only. Additional aspects will be apparent to persons skilled in the relevant art(s) based on the teachings contained herein.

DESCRIPTION OF DIAGRAMS

The features and advantages of the example embodiments described herein will become apparent to those skilled in the art to which this disclosure relates upon reading the following description, with reference to the accompanying drawings.

In the drawings, like reference numbers generally indicate identical or similar elements. Additionally, generally, the left-most digit(s) of a reference number identifies the drawing in which the reference number first appears.

Aspects of the present disclosure will be described with reference to the accompanying drawings.

DETAILED DESCRIPTION

Lidar produces three-dimensional point clouds. From the point clouds, objects need to be detected and tracked. For example, from the point clouds, embodiments detect what kind of object is detected, what shape the object is, and the object's current location and trajectory. Each lidar sensor on a vehicle produces a point cloud periodically. The three dimensional point clouds are aggregated between the lidar sensors and over time to account for the vehicle's ego-motion. Each point includes reflectivity data detected for that voxel.

With the point cloud assembled, the cloud is partitioned into voxels. Each voxel may represent a voxel pattern occupying the vehicle's surroundings. To those voxels containing data, a multi-stage 3D convolutional neural network is applied. This network outputs road geometry, such as road edges and lane dividers. In some embodiments, the network can also output information about other objects in the environment on a parallel network head, such as other vehicles and pedestrians.

The road geometry can be used to localize the vehicle by comparing the road geometry to known maps. In addition, the road geometry can be used to control the vehicle, for example, to ensure that the vehicle stays within its appropriate lane.

Figure 1:
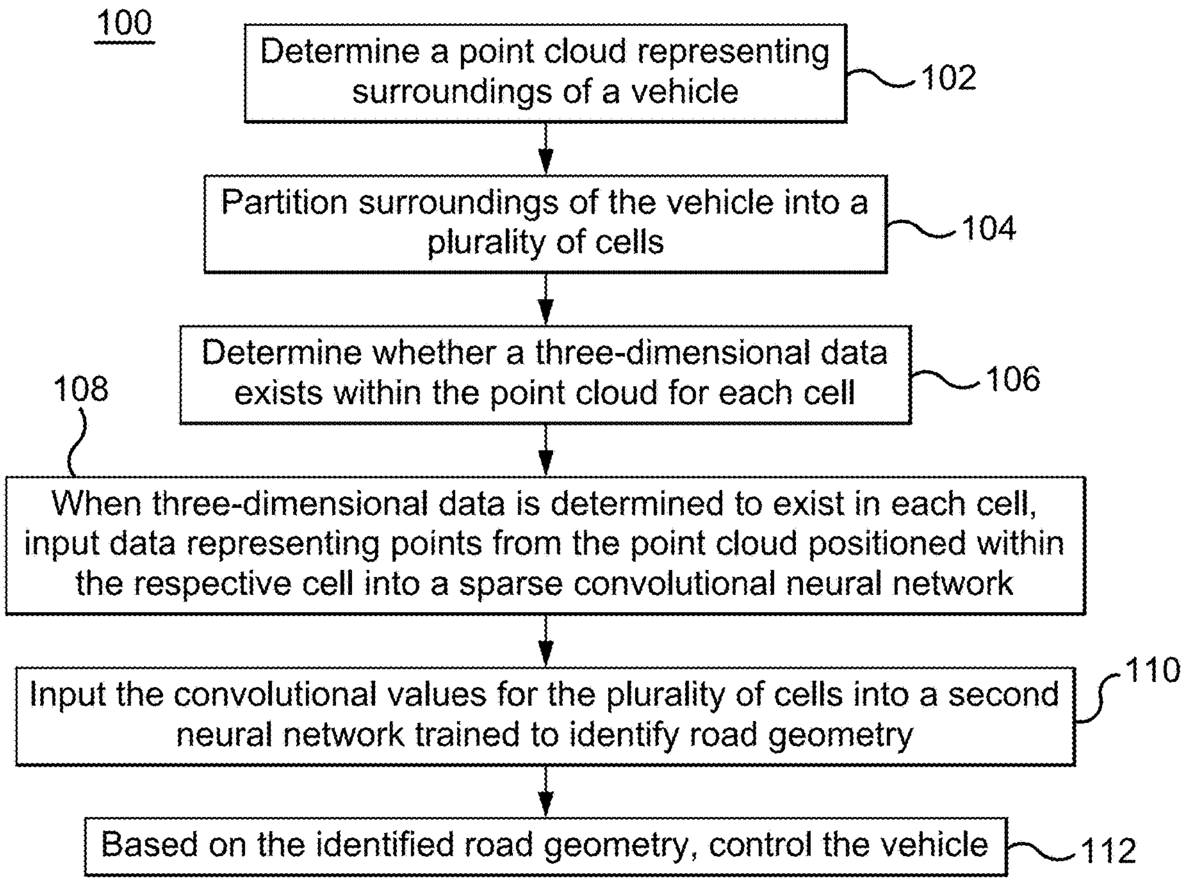
FIG. 1 illustrates a flowchart for identifying road geometry from a point cloud.

FIG. 1 illustrates a method 100 for identifying road geometry from a point cloud. In an embodiment, method 100 may be implemented in any combination of hardware, software, or firmware. In an example, method 100 may be implemented by a computing device on an automotive vehicle. An automotive vehicle is a machine that uses an engine, motor, or other power source to transport people or goods on roads or other surfaces. Automotive vehicles typically have wheels, brakes, steering, and a body or chassis that supports the passengers and cargo. Some common types of automotive vehicles are cars, trucks, buses, and motorcycles.

At 102, a point cloud representing surroundings of the vehicle is determined using at least one sensor on a vehicle. As mentioned above, point clouds are collections of data points that represent the shape and surface of an object or a scene in three-dimensional space. In different embodiments, the point cloud can be generated using cameras, radars, and lidars. In the example where a camera is utilized, the point cloud is constructed using photogrammetry.

Radar is a technology that uses electromagnetic waves to detect and measure the distance, speed, and direction of objects. Radar can also be used to create point clouds, which are collections of points that represent the shape and surface of an object or a scene in three dimensions. To create a point cloud with radar, a transmitter emits a pulse of radio waves that travels in a certain direction and reflects off any object in its path. A receiver then captures the reflected waves and records their time, frequency, and angle of arrival. By using multiple pulses and receivers, or by moving the transmitter and receiver, a radar system can scan a large area and collect multiple reflections from different points on the object or scene. The radar system then processes the data and converts it into a coordinate system that represents the location and intensity of each point.

As described above, lidar is a remote sensing technique that uses pulses of laser light to measure the distance and reflectance of objects on the ground or in the air. A lidar system consists of a laser source, a scanner, a detector, and a computer. The laser source emits a beam of light that is directed by the scanner to scan a certain area or angle. The detector receives the reflected or scattered light from the target and measures the time it takes for the light to travel back. The computer then calculates the distance and the position of the target based on the speed of light and the angle of the scanner. By rotating or scanning the device horizontally and vertically, the lidar can capture multiple points of reflection and form a sweep, or a series of measurements that cover a certain area or volume. How lidar can be used to generate the point cloud is described in greater detail with respect to FIG. 2

Figure 2:
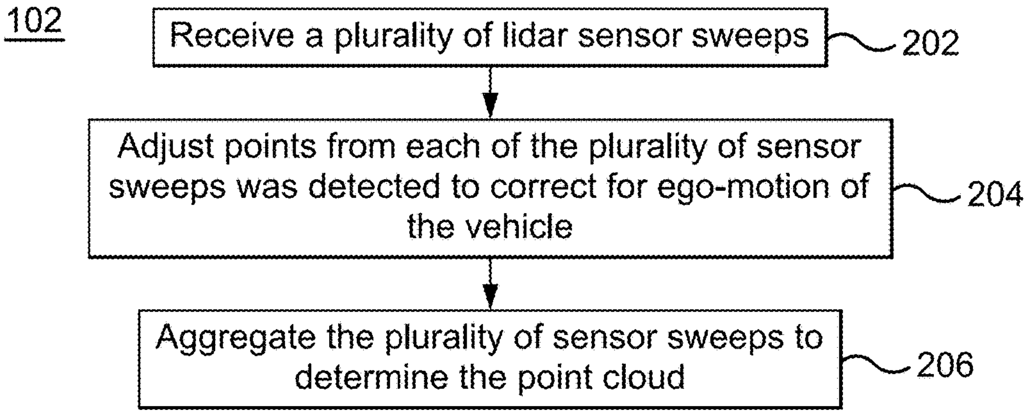
FIG. 2 illustrates a flowchart for determining a point cloud from a plurality of lidar sweeps.

FIG. 2 illustrates a flowchart illustrating an example of how a point cloud can be determined at step 102. In the example in FIG. 2, the point cloud is determined from aggregating a plurality of lidar sweeps.

At 202, a plurality of sensor sweeps are received. Each sensor sweep includes a plurality of points detected in the surroundings at a different time. The plurality of sensor sweeps may be collected from a plurality of lidar sensors on the vehicle.

Figure 3:
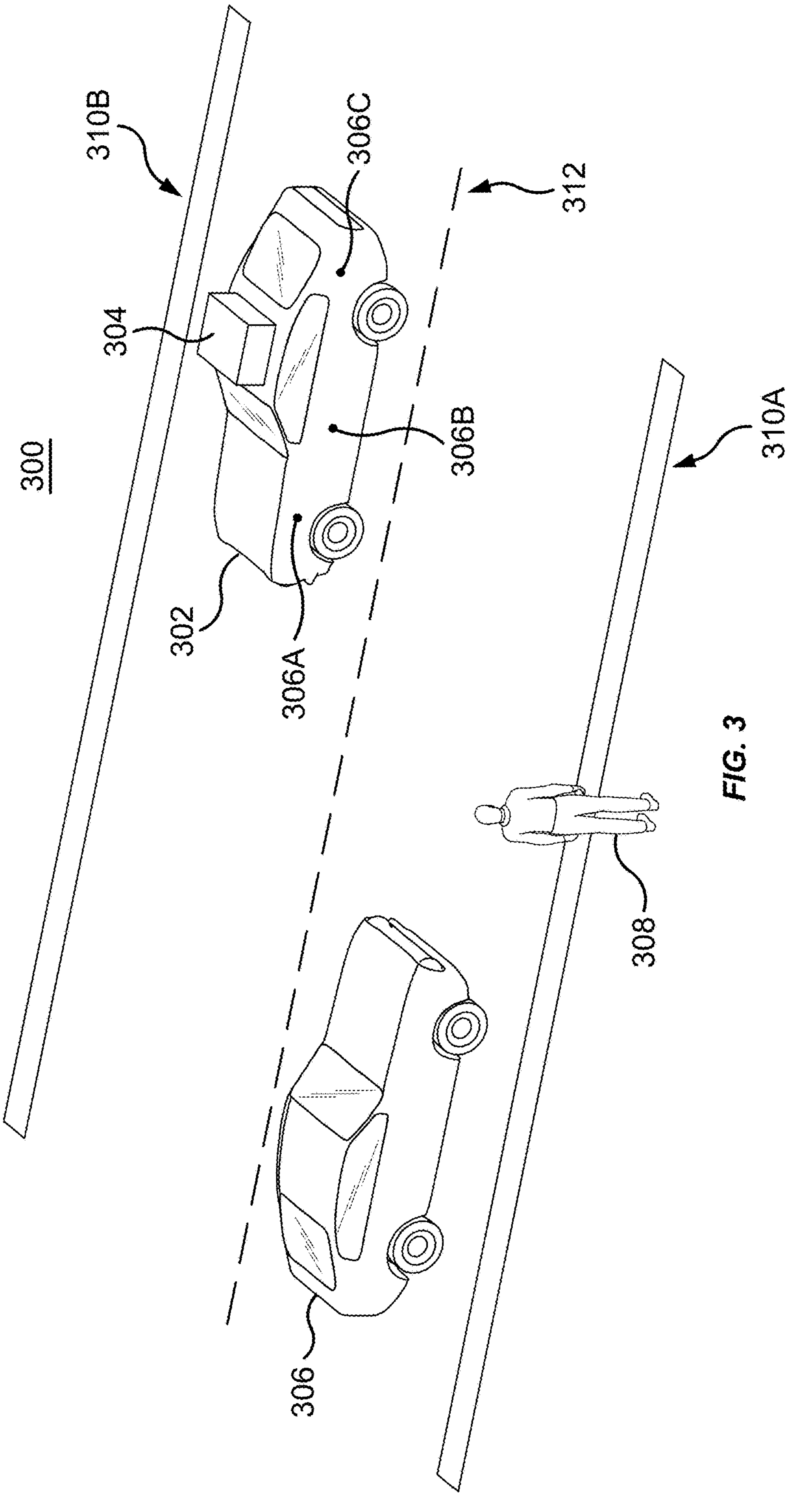
FIG. 3 is a diagram showing a vehicle with a plurality of lidar sensors.

FIG. 3 is a diagram 300 showing a vehicle 302 and its surroundings. The surroundings include a road bounded by road edges 310A-310B. Road edges 310A-310B are the boundaries of the road surface that separate it from the adjacent terrain, such as shoulders, curbs, sidewalks, ditches, or vegetation. Road edges can be marked by various features, such as pavement markings, rumble strips, guardrails, or signs, to enhance the visibility and safety of the road for drivers and pedestrians. Road edges can also be unmarked or indistinct, especially in rural or unpaved roads, which can pose challenges for navigation and lane keeping.

The road also has multiple lanes. Lanes are subdivisions of a road that separate the flow of traffic in the same or opposite directions, or that serve specific purposes such as turning, merging, or parking. Lanes help to organize and regulate traffic, improve safety and efficiency, and reduce congestion and collisions. Lanes are usually marked by lane dividers such as painted lines, signs, or symbols on the road surface, or by physical barriers such as curbs, medians, or guardrails. The road depicted in FIG. 3 has two lanes separated by a lane divider 312.

In FIG. 3, the surroundings of vehicle 302 further include another vehicle 306 and a pedestrian 308. In an example, vehicle 306 may be traveling in the opposite direction relative to vehicle 302 and pedestrian 308 may be stationary.

As mentioned above, vehicle 302 may have a plurality of lidar sensors. The plurality of lidar sensors includes a long range lidar sensor 304 and a plurality of near field, short range lidar sensors 306A-306C. Long range lidar sensor 304 is positioned high on the vehicle, while near field lidar sensors positioned 306A-C around vehicle 302 to capture blind spots from the long range lidar sensor 304. Example lidar sensors are available from Luminar Technologies Inc. of Palo Alto, California, and ZVISION of Beijing, China. In operation, each of sensors 304 and 306A-C can perform several sweeps as vehicle 302 is driving down the road. The plurality of sensor sweeps received at step 202 may include a plurality of sweeps from each of sensors 304 and 306A-C captured consecutively in time.

At 204, points from each of the plurality of sensor sweeps are adjusted to correct for ego-motion of vehicle 302. Ego-motion is the term used to describe the movement of a vehicle relative to its own frame of reference, or how it perceives its own position, orientation, and velocity in the environment. After the adjustment in step 204, every sweep received at step 202 should have a common frame of reference. Ego-motion can be estimated from various sensors, such as inertial measurement units, global positioning systems (GPS), wheel odometry, by using techniques such as visual odometry, visual-inertial odometry, or simultaneous localization and mapping.

Figure 4:
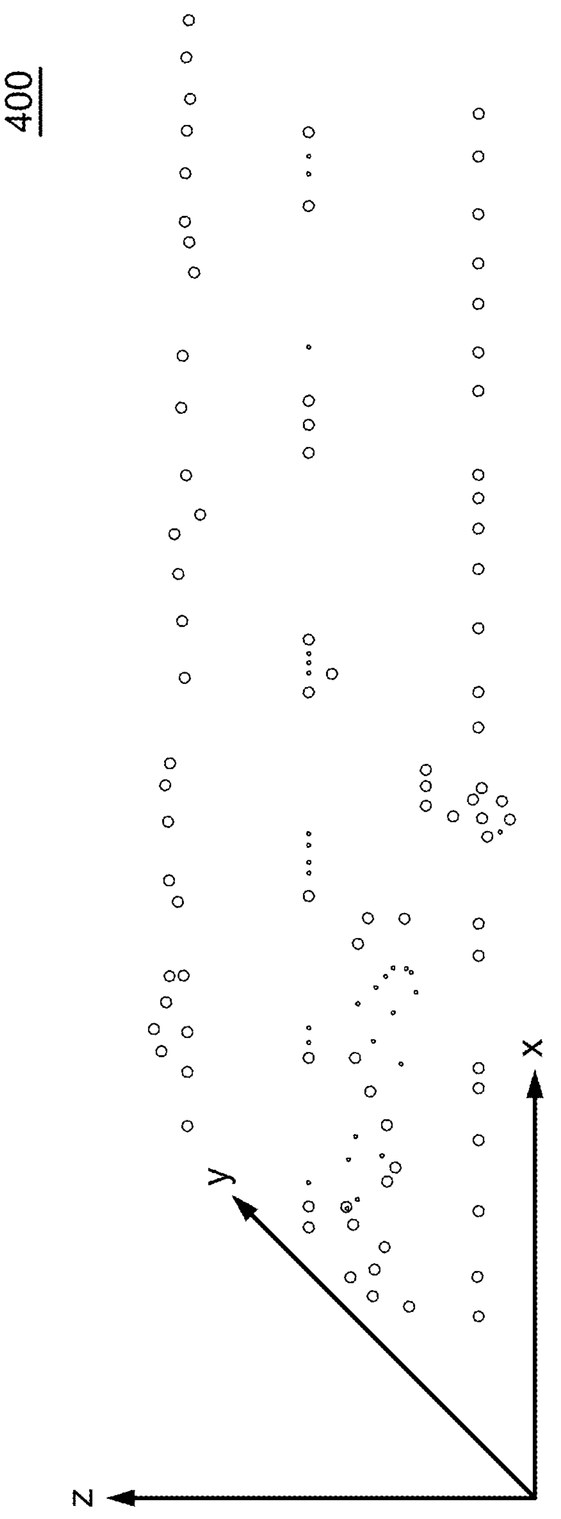
FIG. 4 is a diagram illustrating an example point cloud generated from the plurality of lidar sensors.

At 206, the points adjusted in 204 are aggregated to determine a point cloud describing vehicle 302's surroundings. FIG. 4 is a diagram 400 illustrating an example point cloud generated from the plurality of lidar sensors.

Each point in the point cloud comprises a location in three-dimensional space, a timestamp when the location was detected, and a reflectivity detected at the location. Lidar reflectivity is a measure of how much light is scattered back to a lidar sensor by a target object. In a further embodiment, each point can additionally include a Doppler value detected at the location. A Doppler value is a measure of the change in frequency or wavelength of an electromagnetic wave due to the relative motion of the source and the observer. In this way, the Doppler value may indicate a relative motion of the target object when the point was detected.

As mentioned above, once aggregated, the point cloud in step 206 may include points from multiple sweeps captured at different times. Because the points are captured at different times, objects in motion relative to the earth may be blurred. In the example in FIG. 3, vehicle 306 may be in motion. So, points representing vehicle 306 are in diagram 400 in FIG. 4. As will be discussed below, the network may be trained such that this blurring may be used to determine an object's velocity.

Figure 5:
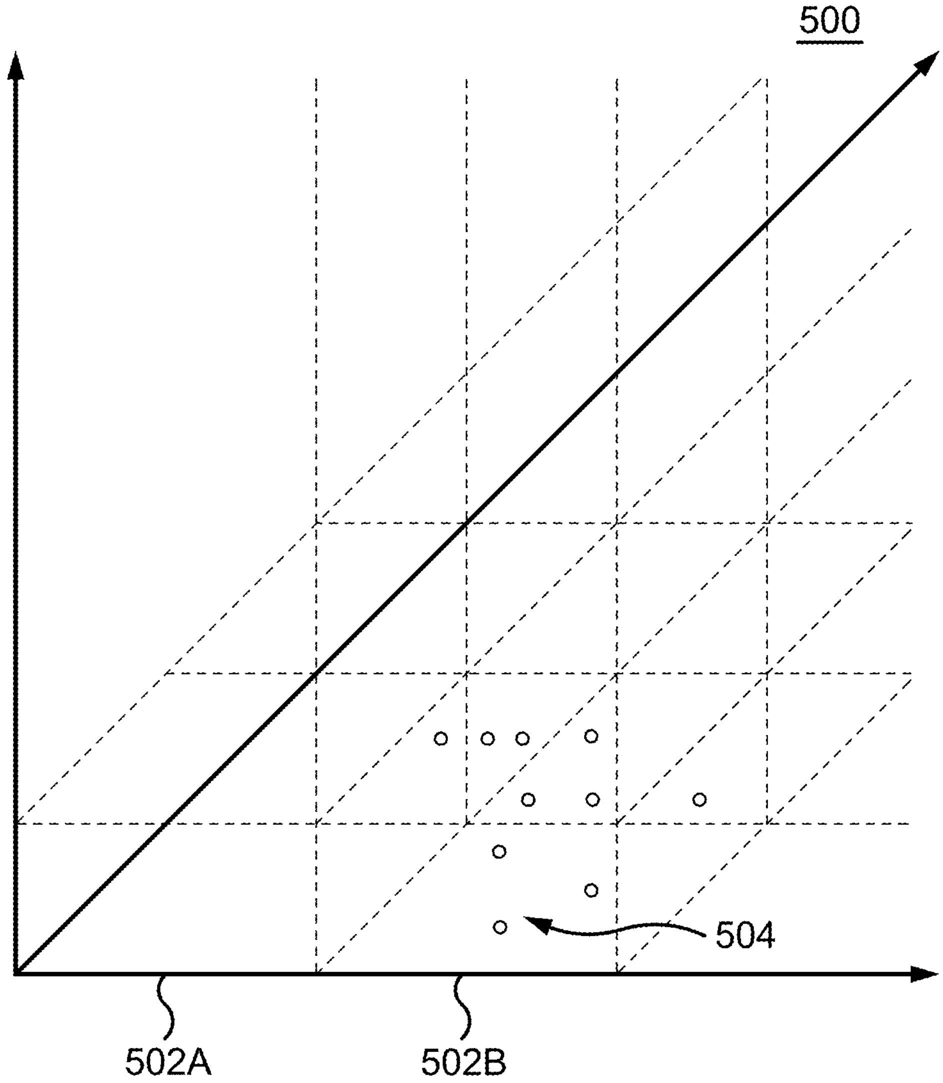
FIG. 5 is a diagram showing how surroundings of the vehicle are partitioned into voxels and those voxels are analyzed to determine whether data exists within them.

Turning to FIG. 1, at 104, surroundings of the vehicle are partitioned into a plurality of voxels. Each voxel represents a volume in the surroundings of the vehicle. Partitioning the surroundings involve voxelization of the area. Voxelization converts the area into a discrete representation composed of small cubic units called voxels. This is illustrated in FIG. 5. FIG. 5 is a diagram 500 showing how surroundings of the vehicle are partitioned into voxels, such as voxels 502A-502B.

At 106, for each of the plurality of voxels, whether a three-dimensional data exists for the respective voxel, is determined. In one embodiment, three-dimensional data may be determined to exist if any point is in the point cloud. If the voxel lacks any point, three-dimensional data may be determined to be absent from the voxel. In another embodiment, three-dimensional data may be determined to exist only if there is a threshold number of points.

At 108, when three-dimensional data is determined in step 106 to exist, data representing points from the point cloud positioned within the respective voxel are input into a sparse convolutional neural network. By restricting this analysis to those voxels where data exists, embodiments may improve efficiency, avoiding a need to conduct analysis on the entire 3D scene that represents a vehicle's surroundings.

Before being input into the sparse convolutional neural network, features may need to be extracted from points positioned within the respective voxel. As mentioned above, each point may be represented by a coordinate in three-dimensional space, a reflectivity value, a timestamp, and, possibly, a Doppler value. In one embodiment, a mean may be determined for each of these values to calculate the features. In another embodiment, a neural network may be used to determine the features from the points as illustrated in FIG. 6.

Figure 6:
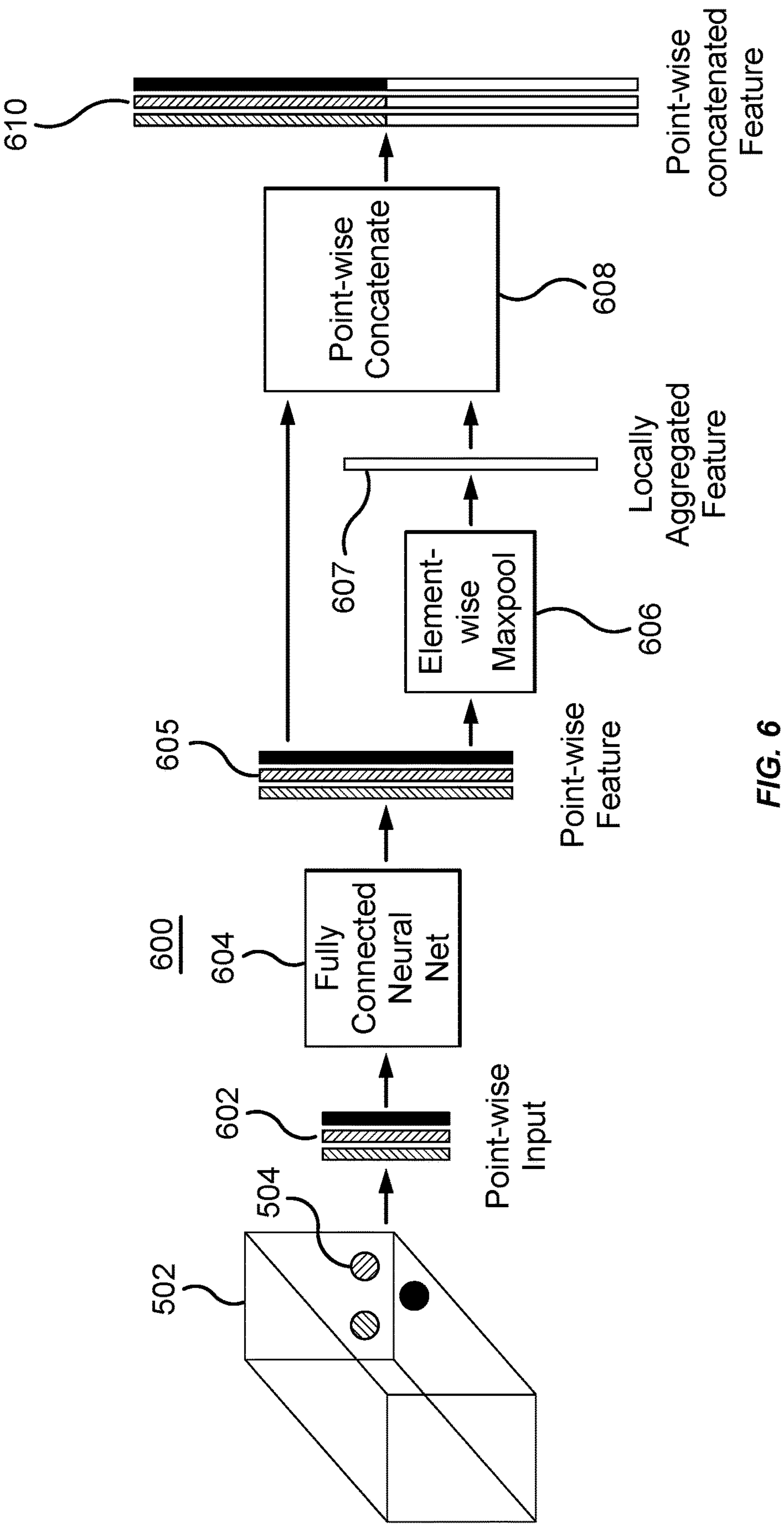
FIG. 6 is a diagram illustrating how features can be generated from points within a voxel.

FIG. 6 is a diagram 600 illustrating how features can be generated from points 504 within voxel 502. The data represented by points 504 may be formatted as a point-wise input 602 into a fully connected neural net 604. Fully connected neural net 604 outputs point-wise features 605. Point-wise features 605 are processed using element-wise maxpool 606 to produce locally aggregated features 607. Element-wise maxpool 606 is a pooling operation that calculates the maximum value for patches of a feature map, and uses it to create a downsampled (pooled) feature map. Point-wise features 605 are concatenated with locally aggregated features 607 at point-wise concatenate 608 to produce point-wise concatenated features 610. In this way, features representing the point cloud positioned within the respective voxel are determined.

With the features representing the point cloud positioned within the respective voxel determined, the features are input into a sparse convolutional neural network at 108. This is illustrated in FIG. 7.

Figure 7:
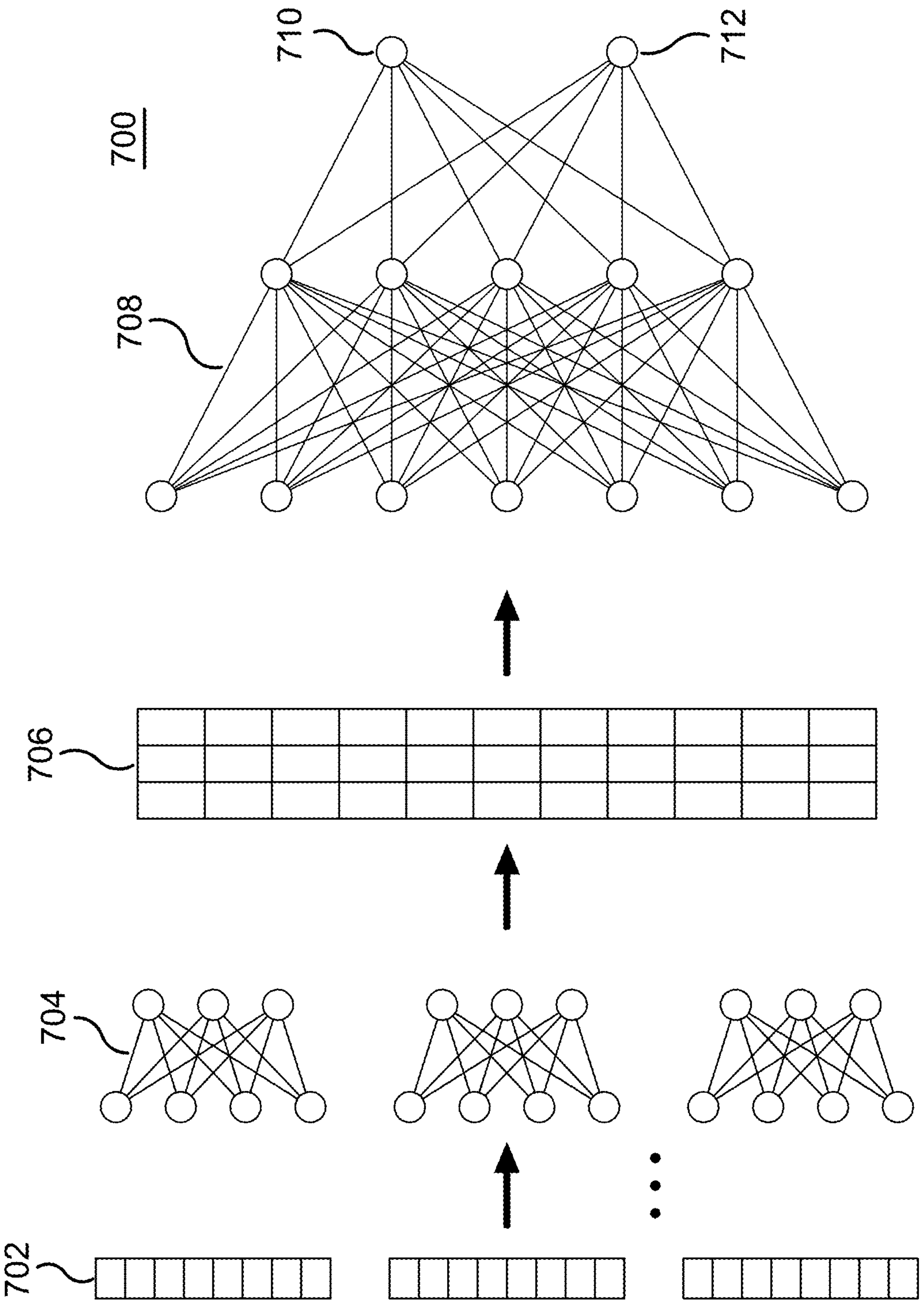
FIG. 7 is a diagram showing how features of the various point clouds are processed through a deep learning neural network to identify objects and road segments.

FIG. 7 is a diagram 700 of showing how features of the various point clouds are processed through a deep learning neural network to identify objects and road segments. diagram 700 shows features 702 being input into a sparse convolutional neural network 704.

Sparse convolutional neural network 704 is a type of neural network. A neural network is a computational model that mimics the structure and function of biological neurons, which can learn from data and perform tasks such as classification, regression, or generation. A neural network consists of layers of artificial neurons, or units, that are connected by weighted links, or synapses, and that process information by applying activation functions and propagating signals forward and backward. A convolutional neural network (CNN) is a type of neural network that is specialized for processing spatial data, such as images, videos, or audio. A CNN uses convolutional layers, which apply filters, or kernels, to extract local features from the input, and pooling layers, which reduce the dimensionality and introduce invariance to translation, rotation, or scaling.

Sparse convolutional neural network 704 is a variant of a CNN that exploits the sparsity of the input or the output, meaning that most of the values are zero or close to zero. Sparse convolutional neural network 704 uses sparse convolutions, which only compute the output for the nonzero input values, and sparse pooling, which only retain the nonzero output values. Sparse convolutional neural network 704 can reduce the computational cost and memory usage of a CNN, and can also capture more fine-grained and contextual information from the sparse data.

Based on features 702, sparse convolutional neural network 704 assembles a two-dimensional grid 706 presenting the convolutional values determined by sparse convolutional neural network 704. Two-dimensional grid 706 may correspond to a top down view of the vehicle's surroundings, and each element in two-dimensional grid 706 may include multiple channels of data.

Returning to FIG. 1, at 110, the convolutional values determined at 108 for the plurality of voxels are input into a second segment of the neural network. As shown in FIG. 7, grid 706 is input into convolutional neural network 708. Convolutional neural network 708 outputs road geometry 710 and objects 712.

Road geometry 710 includes road edges and lane dividers. In an example, road geometry 710 may include a two dimensional grid representing a top-down overlay on the vehicle's surroundings. Each element of the grid may indicate whether a road edge or lane divider passes through the location of the grid element and its direction information. Based on that, splines may be interpolated representing respective road edges and lane dividers.

Notably, lane dividers often have no three-dimensional profile, as they are merely painted on the street. Yet, according to an embodiment, lidar data can be used to detect lane dividers because reflectivity values vary between painted and unpainted pavement.

Objects 712 may identify the object's current location (e.g., its center point), what the object is (e.g., sign, traffic light, vehicles, or pedestrian), what shape the object has (e.g., its dimensions), and what its trajectory is (its velocity including direction of travel).

Figure 8A:
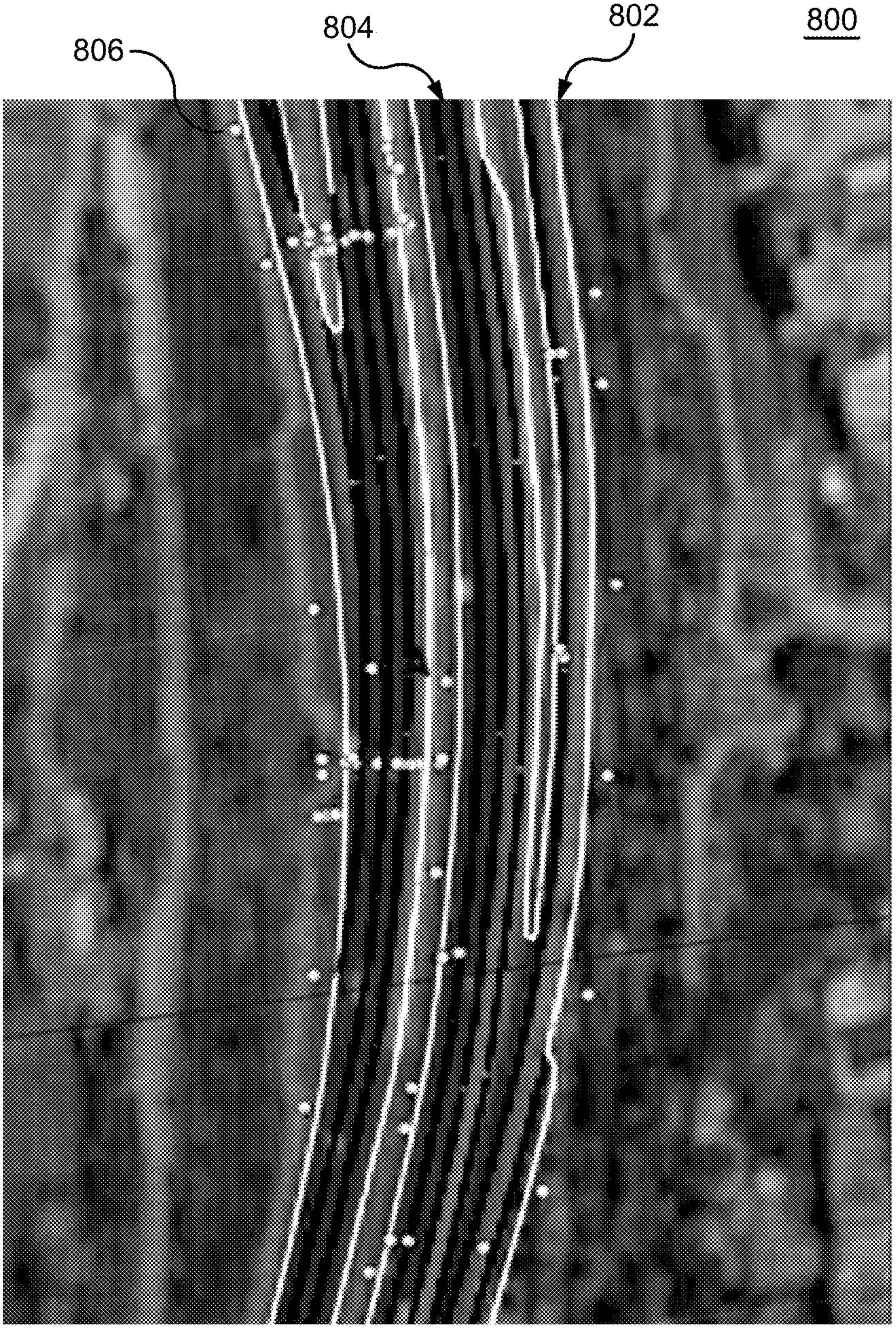
FIGS. 8A-8B are diagrams illustrating identified objects and road geometry.
Figure 8B:
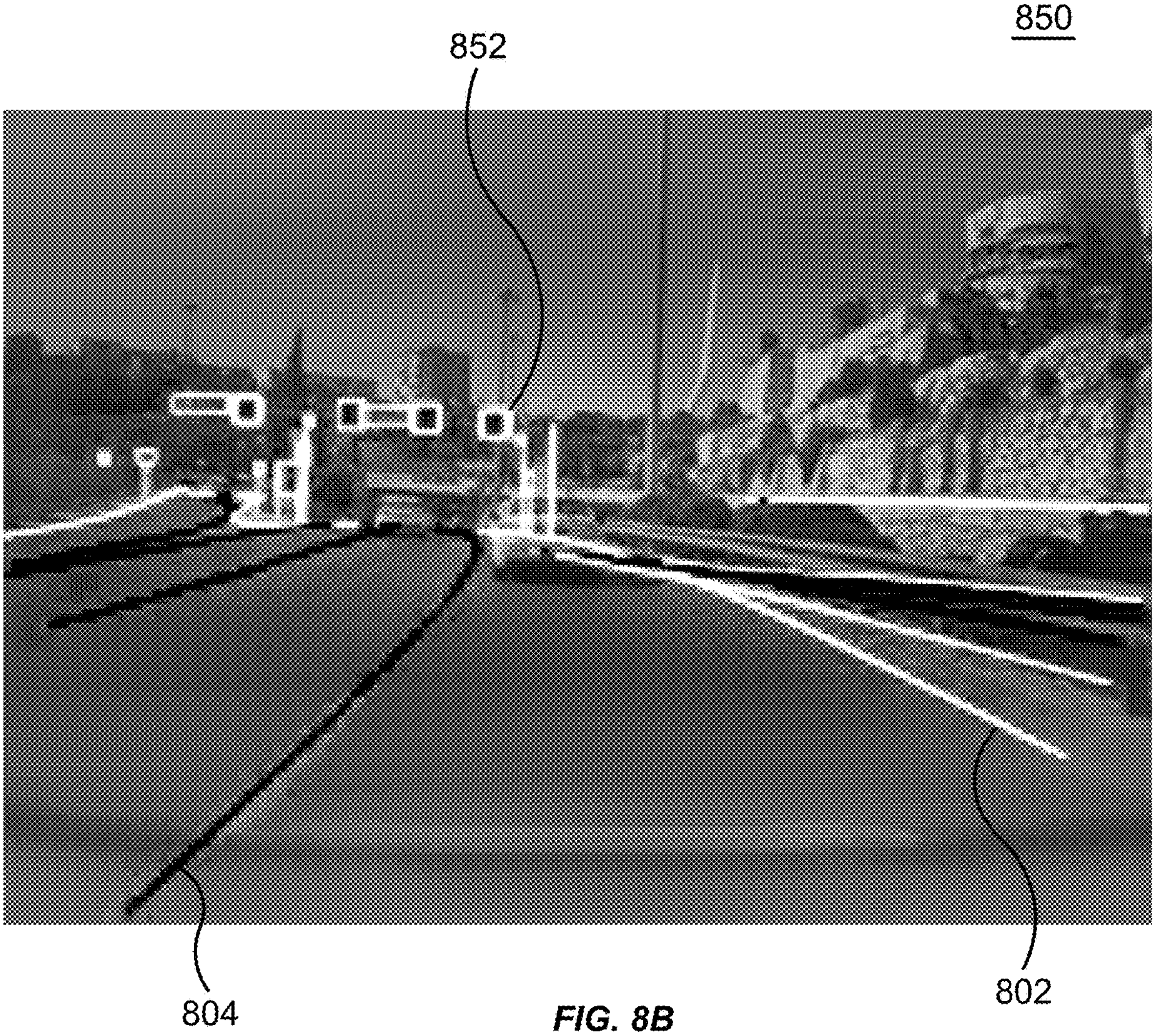

FIGS. 8A-B are diagrams illustrating identified objects and road geometry. FIG. 8A a shows a top-down view 800 and FIG. 8B shows a perspective view 850. Spline 804 represents a lane divider and spine 802 represents a road edge (shown in both views 800 and 850). View 800 includes an object at a center point 806 representing a detected object, and view 850 shows a polygon 852 representing a detected object.

Turning back to FIG. 7, in an embodiment, networks 704 and 708 may be trained together. A training set may be applied with examples of point clouds that have been labeled to identify objects and road geometries. The labeled examples may be applied to a back propagation algorithm to update weights and biases in networks 704 and 708.

Backpropagation can be used to train both the convolutional layers and the fully connected layers. In one example, the training set may be human generated. Additionally or alternatively, the training set may be generated with a larger, more sophisticated neural network or with data generated with a higher resolution lidar sensor than is available on the vehicle.

Turning back to FIG. 1, once the road geometry and objects are determined at 110, the vehicle is controlled based on the identified road geometry and objects at 112. In one embodiment, the identified road geometry and objects may be used to localize the vehicle. The vehicle may store a map with known positions of roads and objects in its vicinity. By comparing the identified road geometry objects to known positions within the map, a precise location of the vehicle can be determined. Localization can be used to control the vehicle both in driver assistance and in autonomous driving, as it allows the vehicle to:

- Align its sensors and cameras with the environment and fuse their data to create a coherent representation of the scene
- Compare its current location with its desired destination and generate a feasible and optimal path to follow
- Detect and avoid obstacles, such as other vehicles, pedestrians, or road signs
- Adjust its speed, steering, and braking according to the traffic rules, road conditions, and user preferences;

In a further example, the identified road geometry and objects may be used to control the vehicle without localization and mapping. The road geometry may specify drivable space. It may be used to ensure that the vehicle stay within its lane until a lane change operation occurs. And, when the lane change operation occurs, the road geometry may be used to navigate between lanes. The object detection may be used to avoid obstacles and to detect relevant road features that may affect driving operation. For example, object detection can be used to detect stop signs and traffic lights. Based on the detected objects, the vehicle may be safely driven according to applicable road regulations.

As mentioned above, method 100 in FIG. 1 may be implemented on a computing device. A computing device may include one or more processors (also called central processing units, or CPUs). The processor may be connected to a communication infrastructure or bus. The computer device may also include user input/output device(s), such as monitors, keyboards, pointing devices, etc., which may communicate with communication infrastructure through user input/output interface(s).

One or more of the processors may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc. Similarly, one or more of the processors may be a deep learning processor (DLP). A DLP is an electronic circuit designed for deep learning algorithms, usually with separate data memory and dedicated instruction set architecture. Like a GPU, a DLP may leverage high data-level parallelism, a relatively larger on-chip buffer/memory to leverage the data reuse patterns, and limited data-width operators for error-resilience of deep learning.

The computing device may also include a main or primary memory, such as random access memory (RAM). The main memory may include one or more levels of cache. Main memory may have stored therein control logic (i.e., computer software) and/or data.

The computing device may also include one or more secondary storage devices or memory. The secondary memory may include, for example, a hard disk drive, flash storage and/or a removable storage device or drive.

The computing device may further include a communication or network interface. The communication interface may allow the computing device to communicate and interact with any combination of external devices, external networks, external entities, etc. For example, the communication interface may allow the computer system to access external devices via a network, which may be wired and/or wireless (or a combination thereof), and which may include any combination of LANs, WANs, the Internet, etc The computing device may also be any of a rack computer, server blade, personal digital assistant (PDA), desktop workstation, laptop or notebook computer, netbook, tablet, smartphone, smartwatch or other wearable, appliance, part of the Internet-of-Things, and/or embedded system, to name a few non-limiting examples, or any combination thereof.

Although several embodiments have been described, one of ordinary skill in the art will appreciate that various modifications and changes can be made without departing from the scope of the embodiments detailed herein. Accordingly, the specification and figures are to be regarded in an illustrative rather than a restrictive sense, and all such modifications are intended to be included within the scope of the present teachings. The benefits, advantages, solutions to problems, and any element(s) that may cause any benefit, advantage, or solution to occur or become more pronounced are not to be construed as a critical, required, or essential features or elements of any or all the claims. The invention(s) are defined solely by the appended claims including any amendments made during the pendency of this application and all equivalents of those claims as issued.

Identifiers, such as "(a)," "(b)," "(i)," "(ii)," etc., are sometimes used for different elements or steps. These identifiers are used for clarity and do not necessarily designate an order for the elements or steps.

Moreover, in this document, relational terms such as first and second, and the like may be used solely to distinguish one entity or action from another entity or action without necessarily requiring or implying any actual such relationship or order between such entities or actions. The terms "comprises", "comprising", "has", "having", "includes", "including", "contains", "containing" or any other variation thereof, are intended to cover a non-exclusive inclusion, such that a process, method, article, or apparatus that comprises, has, includes, or contains a list of elements, does not include only those elements but may include other elements not expressly listed or inherent to such process, method, article, or apparatus. An element preceded by "comprises . . . a", "has . . . a", "includes . . . a", "contains . . . a" does not, without additional constraints, preclude the existence of additional identical elements in the process, method, article, and/or apparatus that comprises, has, includes, and/or contains the element. The terms "a" and "an" are defined as one or more unless explicitly stated otherwise herein. The terms "approximately", "about" or any other version thereof, are defined as being close to as understood by one of ordinary skill in the art. A device or structure that is "configured" in a certain way is configured in at least that way, but may also be configured in ways that are not listed. For the indication of elements, a singular or plural forms can be used, but it does not limit the scope of the disclosure and the same teaching can apply to multiple objects, even if in the current application an object is referred to in its singular form.

The embodiments detailed herein are provided to allow the reader to quickly ascertain the nature of the technical disclosure. It is submitted with the understanding that it will not be used to interpret or limit the scope or meaning of the claims. In addition, in the foregoing Detailed Description, it is demonstrated that multiple features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment in at least some instances. Thus, the following claims are hereby incorporated into the Detailed Description, with each claim standing on its own as separately claimed subject matter.

What is claimed is:

1. A computer-implemented method for detecting road geometry from point clouds, comprising:

(a) determining, using at least one sensor on a vehicle, a point cloud representing surroundings of the vehicle;

(b) partitioning the surroundings of the vehicle into a plurality of voxels, each voxel representing a volume in the surroundings of the vehicle;

for each of the plurality of voxels:

(c) determining, based on the point cloud, whether a three-dimensional data exists for a respective voxel;

(d) in response to determining in (c) that the three-dimensional data is exists, inputting data representing points from the point cloud positioned within the respective voxel into a first neural network segment to extract features for the respective voxel, the first neural network segment being a Fully Connected (FC) feature encoding neural network; and (e) inputting the features determined in (d) for the respective voxel into a second neural network segment trained to identify road geometry and detected objects.

2. The method of claim 1, wherein the determining the point cloud (a) comprises detecting the point cloud using lidar data.

3. The method of claim 1, wherein the determining the point cloud (a) comprises:

receiving a plurality of sensor sweeps, each sensor sweep including a plurality of points detected in the surroundings of the vehicle at a different time;

adjusting points from each of the plurality of sensor sweeps to correct for ego-motion of the vehicle; and aggregating the plurality of sensor sweeps to determine the point cloud.

4. The method of claim 3, wherein the point cloud represents objects in motion relative to earth as blurred.

5. The method of claim 3, wherein the plurality of sensor sweeps are collected from a plurality of lidar sensors on the vehicle.

6. The method of claim 5, wherein the plurality of lidar sensors comprises a long range lidar positioned high on the vehicle and a plurality of near field lidar sensors positioned around the vehicle to capture blind spots from the long range lidar.

7. The method of claim 1, wherein each point in the point cloud comprises a location in three-dimensional space, a timestamp when the location was detected, and a reflectivity detected at the location.

8. The method of claim 7, wherein each point further comprises a Doppler value detected at the location.

9. The method of claim 1, wherein the road geometry comprises road edges and lane dividers.

10. The method of claim 1, further comprising comparing the road geometry to a known map of the surroundings of the vehicle to localize the vehicle.

11. The method of claim 1, further comprising controlling the vehicle based on the road geometry.

12. The method of claim 1, wherein the second neural network outputs, for respective voxels in the plurality of voxels, whether a lane or road edge is within the respective voxel, and at what angle the lane or road edge is passing through the voxel.

13. The method of claim 12, further comprising interpolating, based on an output of the second neural network outputs, a spline representing the road geometry.

14. The method of claim 12, further comprising:

(f) assembling a two-dimensional grid presenting convolutional values determined in (d), wherein the inputting (e) comprises inputting the two-dimensional grid.

15. The method of claim 1, wherein the second neural network detects, based on convolutional values determined in (d), an object in the point cloud.

16. The method of claim 1, wherein the second neural network detects a type of an object, a shape of the object, and a current location and trajectory of the object.

17. The method of claim 1, wherein the first and second neural networks are trained together.

18. The method of claim 17, wherein the first and second neural networks are trained using examples labeled by a more computationally demanding neural network.

19. A non-transitory computer readable medium including instructions for determining road geometry from point clouds that causes a computing system to perform operations comprising:

(a) determining, using at least one sensor on a vehicle, a point cloud representing surroundings of the vehicle;

(b) partitioning the surroundings of the vehicle into a plurality of voxels, each voxel representing a volume in the surroundings of the vehicle;

for each of the plurality of voxels:

(c) determining, based on the point cloud, whether a three-dimensional data exists for a respective voxel;

(d) in response to determining in (c) that the three-dimensional data is exists, inputting data representing points from the point cloud positioned within the respective voxel into a first neural network segment to extract features for the respective voxel, then into a second neural network segment, being a sparse convolutional neural network; and (e) inputting the features determined in (d) for the respective voxel into the second neural network segment trained to identify the road geometry.

20. A processing device for determining road geometry from point clouds, the processing device configured to perform operations comprising:

(a) determining, using at least one sensor on a vehicle, a point cloud representing surroundings of the vehicle;

(b) partitioning the surroundings of the vehicle into a plurality of voxels, each voxel representing a volume in the surroundings of the vehicle;

for each of the plurality of voxels:

(c) determining, based on the point cloud, whether a three-dimensional data exists for a respective voxel;

(d) in response to determining in (c) that the three-dimensional data is exists, inputting data representing points from the point cloud positioned within the respective voxel into a first neural network segment to extract features for the respective voxel, the first neural network segment being for feature encoding; and (e) then inputting the features determined in (d) for the plurality of voxels into a second neural network segment trained to identify the road geometry.

* * * * *